United States Patent
Kitani

(10) Patent No.: US 7,796,169 B2
(45) Date of Patent: Sep. 14, 2010

(54) IMAGE PROCESSING APPARATUS FOR CORRECTING CAPTURED IMAGE

(75) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 795 days.

(21) Appl. No.: 11/109,348

(22) Filed: Apr. 19, 2005

(65) Prior Publication Data

US 2005/0231617 A1 Oct. 20, 2005

(30) Foreign Application Priority Data

Apr. 20, 2004 (JP) .............................. 2004-124409

(51) Int. Cl.
H04N 9/64 (2006.01)
(52) U.S. Cl. ..................... 348/247; 348/246
(58) Field of Classification Search ............... 348/247, 348/246
See application file for complete search history.

(56) References Cited

U.S. PATENT DOCUMENTS

| | | | | |
|---|---|---|---|---|
| 5,144,446 | A * | 9/1992 | Sudo et al. ................... | 348/246 |
| 5,181,118 | A * | 1/1993 | Kimura ....................... | 348/243 |
| 5,198,906 | A * | 3/1993 | Yamashita ................... | 348/246 |
| 5,416,516 | A * | 5/1995 | Kameyama et al. ......... | 348/246 |
| 5,550,936 | A | 8/1996 | Someya et al. | |
| 5,805,216 | A * | 9/1998 | Tabei et al. .................. | 348/246 |
| 5,828,406 | A * | 10/1998 | Parulski et al. ........... | 348/220.1 |
| 5,838,371 | A * | 11/1998 | Hirose et al. ............. | 348/240.2 |
| 5,943,094 | A * | 8/1999 | Sakai et al. ................. | 348/243 |
| 6,618,084 | B1 * | 9/2003 | Rambaldi et al. ........... | 348/247 |
| 6,656,009 | B1 * | 12/2003 | Epping ....................... | 446/268 |
| 6,665,009 | B1 * | 12/2003 | Dong .......................... | 348/246 |
| 6,768,512 | B1 * | 7/2004 | Hsieh ......................... | 348/246 |
| 6,819,359 | B1 * | 11/2004 | Oda ............................ | 348/247 |
| 6,950,133 | B2 * | 9/2005 | Yoshiwara et al. .......... | 348/247 |
| 7,006,136 | B1 * | 2/2006 | Hsieh .......................... | 348/247 |
| 7,034,874 | B1 * | 4/2006 | Reinhart et al. ............. | 348/246 |
| 7,145,599 | B2 * | 12/2006 | Takeda ........................ | 348/247 |
| 7,202,894 | B2 * | 4/2007 | Kaplinsky et al. ........... | 348/246 |
| 7,206,020 | B2 * | 4/2007 | Kato ............................ | 348/247 |
| 7,209,168 | B2 * | 4/2007 | Post ............................. | 348/246 |
| 7,280,142 | B2 * | 10/2007 | Toyoda et al. ............... | 348/246 |

(Continued)

FOREIGN PATENT DOCUMENTS

JP 05-075861 A 3/1993

(Continued)

Primary Examiner—John M Villecco
Assistant Examiner—Kent Wang
(74) Attorney, Agent, or Firm—Canon U.S.A., Inc. I.P. Division

(57) ABSTRACT

An image processing apparatus selects a correction method of a defective pixel in accordance with the type of the defective pixel. The image processing apparatus includes an imaging device consisting of a plurality of pixels, a storage device for storing a captured image output from the imaging device, a first correction processing device for correcting a defective pixel in the captured image based on first corrective data containing address information of a defective pixel in the imaging device in accordance with input of a signal output from the defective pixel in the imaging device, and a second correction processing device for correcting the defective pixel in the captured image stored in the storage device based on second corrective data containing address information of a defective pixel in the imaging device.

13 Claims, 8 Drawing Sheets

U.S. PATENT DOCUMENTS

| | | | |
|---|---|---|---|
| 7,365,783 B2 * | 4/2008 | Hashimoto et al. | 348/246 |
| 7,408,578 B2 * | 8/2008 | Chapman et al. | 348/308 |
| 7,443,433 B2 * | 10/2008 | Hara | 348/246 |
| 2003/0169352 A1 | 9/2003 | Kitani | |
| 2003/0179418 A1 * | 9/2003 | Wengender et al. | 358/437 |
| 2004/0036788 A1 * | 2/2004 | Chapman et al. | 348/308 |
| 2004/0096125 A1 * | 5/2004 | Alderson et al. | 382/312 |
| 2004/0189838 A1 * | 9/2004 | Sasaki | 348/242 |

FOREIGN PATENT DOCUMENTS

| | | |
|---|---|---|
| JP | 2000-23051 A | 1/2000 |
| JP | 2003-333435 A | 11/2003 |
| JP | 2004-015191 A | 1/2004 |
| JP | 2004-064512 A | 2/2004 |

* cited by examiner

FIG. 6

|  | $t \leq T1$ | $T1 < t \leq T2$ | $t > T2$ |
|---|---|---|---|
| ISO100 | data1 | data2 | data5 |
| ISO200 | data1 | data3 | data5 |
| ISO400 | data1 | data4 | data5 |

| data1 | TIME-INDEPENDENT DEFECTS |
|---|---|
| data2 | GREATER THAN OR EQUAL TO 100 mV |
| data3 | GREATER THAN OR EQUAL TO 50 mV |
| data4 | GREATER THAN OR EQUAL TO 25 mV |
| data5 | GREATER THAN OR EQUAL TO 12.5 mV |

IMAGE PROCESSING APPARATUS FOR CORRECTING CAPTURED IMAGE

BACKGROUND OF THE INVENTION

1. Field of the Invention

The present invention relates to an image processing apparatus and an image processing method for capturing, recording, and playing back still and moving images and, in particular, to a correction technology of a captured image.

2. Description of the Related Art

Recently, image processing apparatuses such as digital cameras have become available on the market. The image processing apparatuses record and play back a still image and a moving image captured by a solid-state imaging device, such as CCD (Charge-Coupled Device) and CMOS (Complementary Metal-Oxide Semiconductor) devices, using a recording medium, such as a memory card including a solid-state memory device.

When capturing an image using a solid-state imaging device, such as CCD and CMOS devices, dark noise can be corrected through a computing process using two types of data: dark image data, which is acquired from the imaging device after charge accumulation under the same conditions as actual shooting without exposure, and actually shot image data with exposure. This dark noise correction process can compensate for image quality degradation due to dark current noise generated by the imaging device and missing pixels due to a small defect specific to the imaging device. Thus, the captured image data can be corrected so as to provide a high-quality image.

Additionally, by arithmetic interpolation using image data of pixels adjacent to a defective pixel, a point defect can be corrected to further reduce the image quality degradation.

In a known correction method of a defective pixel, an output of a sensor after a standard charge accumulation time under predetermined conditions is evaluated to detect a defective pixel when the sensor is shipped from a factory. Then, the type of the defective pixel (e.g., a black spot or a white spot), the address (e.g., positional data (x, y)) of the defective pixel, and level data of the defect are acquired to correct the defective pixel using these data (refer to, for example, Japanese Patent Laid-Open No. 2000-23051).

It is known that a defective pixel, in particular, a white-spot defect, significantly varies its level depending on a charge accumulation time during shooting. Thus, even a defective pixel which does not cause a problem in an ordinary several-second shooting period causes image quality degradation in a long shooting period, since the long shooting period significantly increases the level of the defective pixel. In particular, without the above-described dark noise interpolation correction, a small defect is not corrected. Therefore, image quality degradation due to the missing pixel noticeably appears during a long shooting period.

However, if a defective pixel is detected in accordance with a level of the defective pixel during a long shooting period and if the correction process is carried out for all the pixels, the number of corrections for the defective pixels significantly increases.

In known interpolation methods for a defective pixel, the level of the defective pixel is generally replaced with a value computed from the outputs of pixels adjacent to the defective pixel and having the same color as the defective pixel.

If the arithmetic interpolation is carried out by firmware using image data of pixels adjacent to the defective pixel stored in a memory after capturing, the following processes are required: a readout process of the outputs of adjacent pixels having the same color, a computing process, and a writing process of the corrected value to the defective pixel. Therefore, as the number of defective pixels increases, a considerable amount of time is required to access the memory. This long operation time creates a bottleneck, such as a release time lag and a delay between shots.

On the other hand, to decrease such a long operation time, the process carried out by hardware is proposed. For example, in Japanese Patent Laid-Open No. 2000-23051, the address of a defective pixel is recorded in advance. If the readout address is identical to the recorded address, the output of the defective pixel is replaced with the output of a pixel adjacent to the defective pixel. This hardware process can provide a sufficient correction for a single defective pixel. However, if adjacent multiple defects, in which a plurality of adjacent pixels have a defect, exist and if a high-quality correction is expected in which the result of defect correction is invisible, pixels in the vicinity of the defective pixel should be used for the interpolation. For example, if the output of the defective pixel is replaced with the output of the previous pixel having the same color by hardware and if the consecutive pixels having the same color in the horizontal direction have defects, all the outputs are replaced with the output of the previous pixel. Accordingly, for, in particular, an image having a high spatial frequency, the result of the correction becomes visible, which is a problem.

The firmware process, as described above, can make an appropriate determination at a readout time of pixels in the vicinity of the defective pixel. Accordingly, an optimum correction method can be applied to the consecutive defective pixels. For example, even consecutive defective pixels can be corrected by first correcting the outermost defective pixel among the consecutive defective pixels using outputs of non-defective pixels in the vicinity of the defective pixel, and then sequentially correcting the inner defective pixels. However, the hardware that carries out the real-time correction using the outputs in the vicinity of the defective pixel during a readout operation requires, at a time, a large amount of processing memory for storing outputs of pixels in the vicinity of the defective pixel. Thus, the hardware configuration becomes significantly large and complicated, and therefore, the hardware method is not practical.

SUMMARY OF THE INVENTION

The present invention has been made in consideration of the above situation, and provides an apparatus and a method for processing an image without requiring a long processing time, without degrading the quality of a corrected image, and without increasing the hardware configuration size by changing a correction method depending on the type of a defective pixel.

According to an aspect of the present invention, an image processing apparatus includes an imaging device comprising a plurality of pixels, a first correction processing device for correcting a defective pixel in a captured image output from the imaging device based on first corrective data containing address information of a defective pixel in the imaging device in accordance with input of a signal output from the defective pixel in the imaging device, a storage device for storing the captured image output from the imaging device including data correcting the defective pixel by the first correction processing device, and a second correction processing device for correcting the defective pixel in the captured image stored in the storage device, based on second corrective data containing address information of the defective pixel in the imaging device.

According to another aspect of the present invention, an image processing apparatus includes an imaging device comprising a plurality of pixels, a first correction processing device for correcting a defective pixel in the captured image based on corrective data containing address information of a defective pixel in the imaging device in accordance with input of a signal output from the defective pixel in the imaging device, a storage device for storing the captured image output from the imaging device including corrective data correcting the defective pixel by the first correction processing device, a second correction processing device for correcting the defective pixel in the captured image based on the corrective data corrected by the first correction processing device and stored in the storage device, and a control device for carrying out a correction process by selecting one of the first correction processing device and the second correction processing device in accordance with address information of the defective pixel in the imaging device.

According to another aspect of the present invention, an image processing method includes a first storage step for storing a captured image output from an imaging device comprising a plurality of pixels, a first correction processing step for correcting a defective pixel in the captured image stored in the first storage step based on first corrective data containing address information of a defective pixel in the imaging device in accordance with input of a signal output from the defective pixel in the imaging device, a second storage step of storing corrective pixel data based on the first correction processing step, and a second correction processing step for correcting the defective pixel in the captured image corrected by the first correction processing step and stored in the second storage step, based on second corrective data containing address information of the defective pixel in the imaging device.

According to yet another aspect of the present invention, an image processing method includes a first storage step for storing a captured image output from an imaging device comprising a plurality of pixels, a first correction processing step for correcting a defective pixel in the captured image stored in the first storage step based on corrective data containing address information of a defective pixel in the imaging device in accordance with input of a signal output from the defective pixel in the imaging device, a second storage step for storing corrective data based on the first correction processing step, a second correction processing step for correcting the defective pixel in the captured image corrected by the first correction processing step and stored in the second storage step, based on the corrective data, and a control step for carrying out a correction process by selecting one of the first correction processing step and the second correction processing step in accordance with the address information of a defective pixel in the corrective data.

Further features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a diagram illustrating the corrective data used for a defect correction process.

DESCRIPTION OF THE EMBODIMENTS

Embodiments of the present invention will be described in detail below with reference to the accompanying drawings. However, the dimensions, materials, shapes and relative positions of the constituent parts shown in the embodiments can be changed as convenient depending on various conditions and on the structure of the apparatus adapted to the invention, and the invention is not limited to the embodiments described herein.

Figure 1:
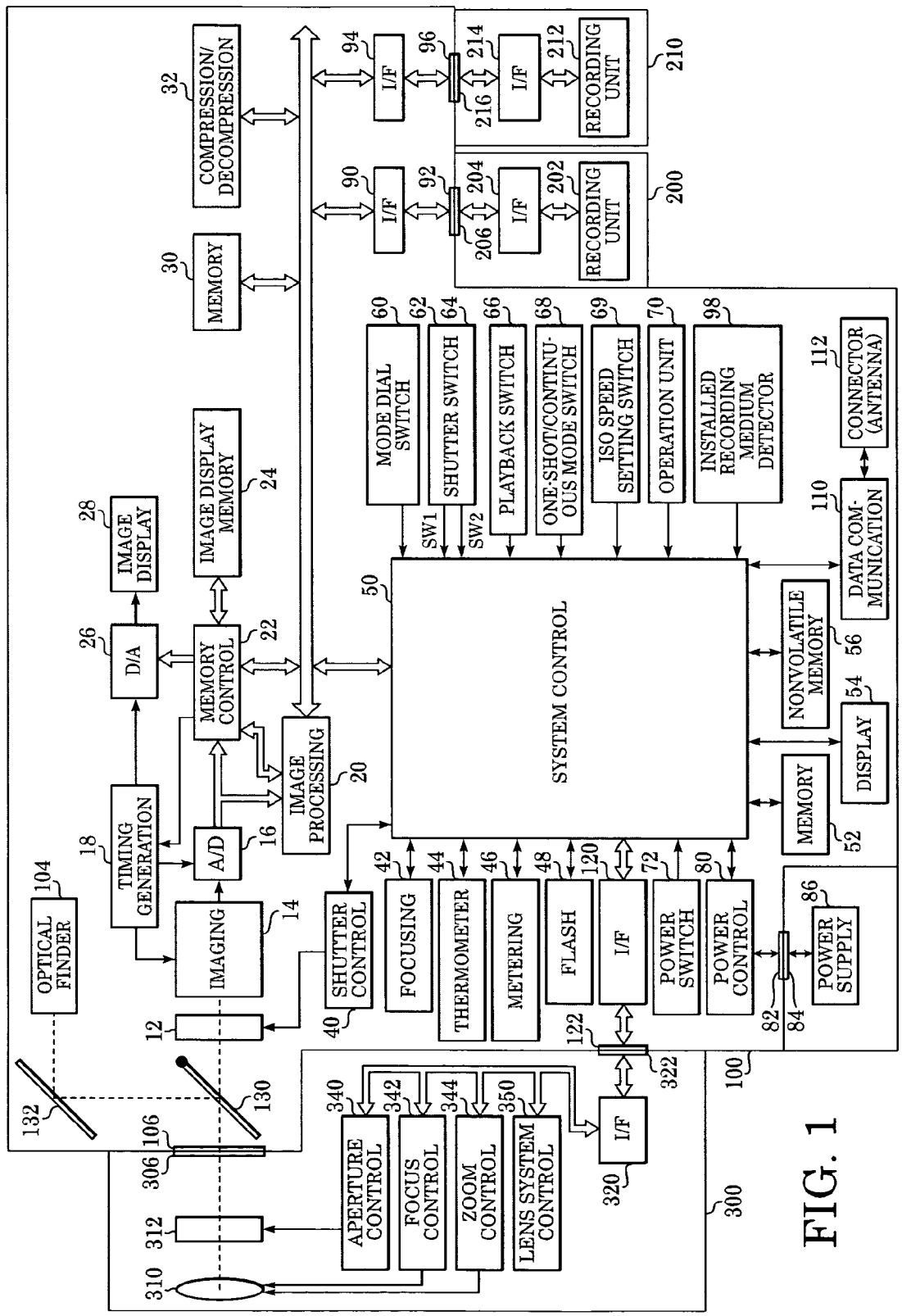
FIG. 1 is a block diagram of an image processing apparatus according to an embodiment of the present invention.

FIG. 1 is a block diagram of an image processing apparatus 100 according to an embodiment of the present invention. The image processing apparatus 100 includes a shutter 12 for controlling an amount of exposure to an imaging device 14, which converts an optical image to an electrical signal. Light incident on a lens 310 is led to an aperture 312, lens mounts 306 and 106, a mirror 130, and the shutter 12 to be focused through a single-lens reflex mechanism on the imaging device 14 as an optical image.

An analog-to-digital (A/D) converter 16 converts an analog signal output from the imaging device 14 to a digital signal. A timing generation circuit 18 supplies a clock signal and a control signal to the imaging device 14, the A/D converter 16, and a digital-to-analog (D/A) converter 26. The timing generation circuit 18 is controlled by a memory control circuit 22 and a system control circuit 50.

An image processing circuit 20 carries out predetermined pixel interpolation and color conversion on data from the A/D converter 16 or data from the memory control circuit 22. The image processing circuit 20 further carries out a predetermined computing process on the captured image data, when needed, and the system control circuit 50 controls shutter control portion 40 and focus control portion 342 based on the computational result to provide an auto focus (AF) function, an auto exposure (AE) function, and an electronic flash (EF) function in the through-the-lens (TTL) method. Furthermore, the image processing circuit 20 carries out a predetermined computing process on the captured image data to provide an auto white balance (AWB) function in the TTL method based on the computational result.

In this embodiment, the configuration includes dedicated focusing portion 42 and dedicated metering portion 46. Therefore, the focusing portion 42 and the metering portion 46 may provide the AF function, the AE function, and the EF function, thus eliminating these functions provided by the image processing circuit 20. Alternatively, the focusing portion 42 and the metering portion 46 may provide these functions and the image processing circuit 20 may further provide these functions.

The memory control circuit 22 controls the A/D converter 16, the timing generation circuit 18, the image processing circuit 20, an image display memory 24, the D/A converter 26, a memory 30, and a compression/decompression circuit 32. Data from the A/D converter 16 is written to the image display memory 24 or the memory 30 via the image processing circuit 20 and the memory control circuit 22.

The image processing circuit 20 includes a defect correction circuit, which replaces an output of a defective pixel among data input from the A/D converter 16 with the previous output of a pixel having the same color. The function of the defect correction circuit is described next with reference to FIG. 8. At factory shipment, various types of defect pixels of the imaging device 14 are extracted from image data acquired during a predetermined time period at a predetermined environmental temperature. Based on the data at factory shipment, which includes the type of defective pixel, the address of the defective pixel, and the level of the defective pixel, data to be stored in the memory 30 of the image processing apparatus 100 is created. This process is carried out outside the image processing apparatus 100.

More specifically, a white-spot defect, which requires a correction process depending on a shooting scene, is determined. Many white-spot defects tend to increase the level thereof as the exposure time (accumulation time) increases. Therefore, even white-spot defects having the same level present different defect levels in an image depending on a set ISO speed (i.e., gains of the imaging device 14 and the image processing circuit 20). To avoid this phenomenon, for example, a white-spot defect is determined by providing a table containing a set ISO speed and a shutter speed (accumulation time) and extracting a pixel needed for the correction in each region based on the defect level at factory shipment. At the same time, by analyzing the address of the detected defective pixel, it can be determined whether the defective pixel is a single defective pixel or an adjacent defective pixel, which has another adjacent defective pixel having the same color.

For the addresses of the defective pixels, two sets of information are stored in two different regions. One set includes at least address information of a pixel called a single defective pixel, which does not have another defective pixel having the same color in the vicinity thereof. Hereinafter, this information is referred to as "single defective pixel address information". The other set includes at least address information of a pixel called an adjacent defective pixel, which has another adjacent defective pixel having the same color. Hereinafter, this information is referred to as "adjacent defective pixel address information".

Figure 8:
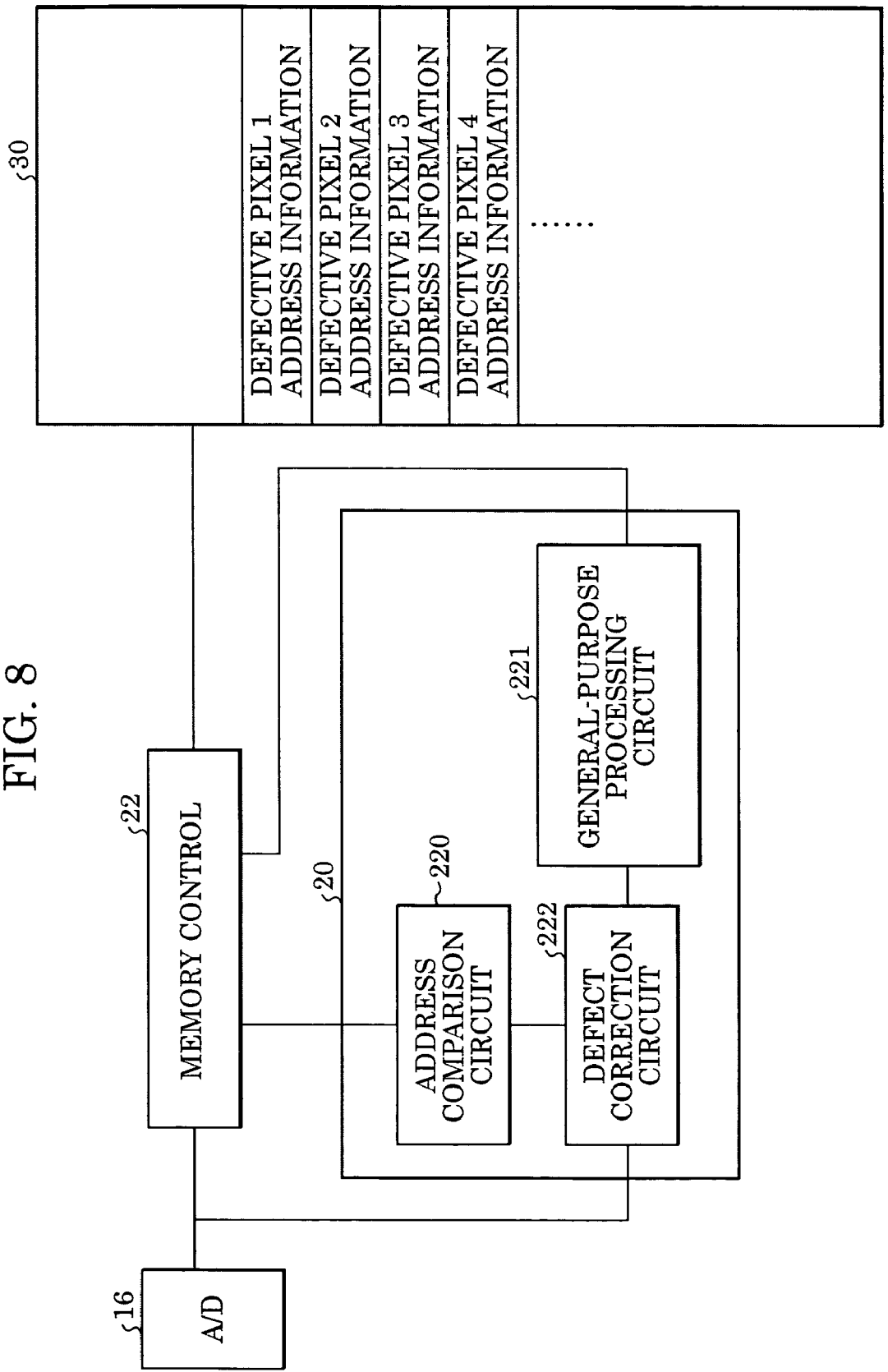
FIG. 8 is a block diagram of an image processing circuit including a defect correction circuit.

As shown in FIG. 8, an image processing circuit 20, a memory control circuit 22, and a memory 30 are identical to those in FIG. 1. The image processing circuit 20 includes an address comparison circuit 220, which reads out single defective pixel address information stored in the memory 30 via the memory control circuit 22. The single defective pixel address information is read out of a nonvolatile memory 56 and is stored in the memory 30 in advance. The address comparison circuit 220 then compares the address information with an address of the imaging device currently read out. If the addresses compared by the address comparison circuit 220 are the same, a defect correction circuit 222 replaces the output of the defective pixel written in the single defective pixel address information in the memory 30 with the output of the previous pixel having the same color.

As described above, while reading out of the imaging device 14, the image processing circuit 20 compares an address of the imaging device currently read out with the single defective pixel address information pre-stored in the memory 30. If the addresses match, the output of the defective pixel is not used but is replaced with the output of the previous pixel having the same color. Accordingly, when the readout from the imaging device 14 is completed and the data read out from the imaging device 14 is input to a general-purpose processing circuit 221, all of the correction processes on the defective pixels written in the single defective pixel address information are already completed.

Referring back to FIG. 1, an image display unit 28 includes a display, such as a thin-film transistor liquid crystal display (TFT-LCD). The image display unit 28 displays image data written in the image display memory 24 via the D/A converter 26. Displaying captured image data serially via the image display unit 28 can provide an electronic viewfinder function. Also, the display on the image display unit 28 can freely be turned on and off in response to the control of the system control circuit 50. By turning off the display, the power consumption of the image processing apparatus 100 can be significantly reduced.

The memory 30 is used for storing captured still and moving images. The memory 30 has sufficient capacity for storing a predetermined number of still images and a moving image for a predetermined time period. Thus, even in a continuous shooting mode, in which a plurality of still images are continuously captured, and even in a panorama shooting mode, a rapid burst of images can be written to the memory 30. Additionally, the memory 30 can be used for a work area of the system control circuit 50.

The compression/decompression circuit 32 compresses and decompresses image data using a method like the adaptive discrete cosine transform (ADCT). The compression/decompression circuit 32 reads out an image stored in the memory 30, compresses or decompresses the image, and stores the processed data in the memory 30.

The shutter control portion 40 controls the shutter 12 based on metering information from the metering portion 46 in corporation with aperture control portion 340, which controls the aperture 312. The focusing portion 42 provides an auto focus (AF) function. By leading light incident on the lens 310 to the focusing portion 42 via the aperture 312, the lens mounts 306 and 106, the mirror 130, and a focusing sub mirror (not shown) through a single-lens reflex mechanism, the focusing state of an image formed as an optical image can be measured. A thermometer 44 can detect a temperature in a shooting environment. If the thermometer 44 is installed in a sensor, a dark current can be more accurately estimated.

The metering portion 46 is used for an auto exposure (AE) function. By leading light incident on the lens 310 to the metering portion 46 via the aperture 312, the lens mounts 306 and 106, the mirror 130, a mirror 132, and a metering lens (not shown) through a single-lens reflex mechanism, the exposure status of an image formed as an optical image can be measured. The metering portion 46 also provides an electric flash (EF) function in corporation with a flash 48. The flash 48 provides an AF assist beam emitting function as well as a flash light control function.

Additionally, exposure control and auto focus (AF) control can be carried out using a video TTL method, in which the system control circuit 50 controls the shutter control portion 40, the aperture control portion 340, and the focus control portion 342 based on the computational result from the image processing circuit 20 computing image data captured by the imaging device 14. Also, the auto focus (AF) control may be carried out using both the measurement result of the focusing portion 42 and the computational result from the image processing circuit 20 computing image data captured by the imaging device 14. Furthermore, the exposure control may be carried out using both the measurement result of the metering portion 46 and the computational result from the image processing circuit 20 computing image data captured by the imaging device 14.

The system control circuit 50 controls the image processing apparatus 100. A memory 52 stores constants, variables, and programs used for the operation of the system control circuit 50.

A display unit 54 includes a liquid crystal display device and a speaker that represent an operation mode and a message using text, images, and voice. The display unit 54 or a plurality of the display units 54 is installed at an easily viewable position near an operation unit of the image processing apparatus 100. For example, the display unit 54 is composed of a combination of an LCD, an LED, and a sound element. Several functions of the display unit 54 are disposed inside an optical finder 104. On an LCD, the display unit 54 displays, for example, a one-shot/continuous shooting mode, a self-timer setting, a compression ratio, an ISO speed, recording pixel resolution, the number of pictures taken, the number of pictures remaining, a shutter speed, an aperture setting, an exposure compensation factor, a flash status, a red-eye reduction flash, a macro shooting mode, a buzzer setting, a level of a clock battery, a level of a main battery, an error, multiple-digit information, a mount status of recording media 200 and 210, a mount status of a lens unit 300, the operational status of a communication interface (I/F), date and time, and the connection status with an external computer. On the optical finder 104, the display unit 54 displays, for example, an in-focus indicator, a shooting-ready indicator, a camera shake warning, a flash recharge status, flash recharge completion, a shutter speed, an aperture setting, an exposure compensation status, and a writing status to a recording medium. Furthermore, using one or more LEDs, the display unit 54 displays, for example, an in-focus indicator, a shooting-ready indicator, a camera shake warning, a flash recharge level, flash recharge completion, a writing status to a recording medium, a macro shooting setting, and a charge level of a secondary battery. In addition, the display unit 54 lights a lamp, for example, to notify a self-timer status. This self-timer notification lamp may be used as an AF assist illuminator.

The nonvolatile memory 56 is an electrically recordable and erasable memory. For example, an electrically erasable programmable read-only memory (EEPROM) is used for the nonvolatile memory 56. The nonvolatile memory 56 stores data including various types of parameters, ISO settings, a setting mode, and address information of defective pixels. Since the process of the address information of defective pixels requires a large amount of time, this information is copied from the nonvolatile memory 56 to the memory 30 when needed.

Operation portions 60, 62, 64, 66, 68, 69, and 70 input various types of operation commands from the system control circuit 50. Each of the operation portions is composed of a combination of a single or a plurality of switches, dials, touch panels, eye controlled focus pointers, and speech recognition devices.

Each of the operation portions will be described next in detail. A mode dial switch 60 is used for changing shooting modes. The shooting modes include, for example, an auto mode, a program mode, a shutter priority mode, an aperture priority mode, a manual mode, a depth of field mode, a portrait mode, a landscape mode, a close-up mode, a sports mode, a night-scene mode, and a panorama mode.

A shutter switch SW1 62 turns on during pressing a shutter button (not shown) to start the auto focus (AF) operation, the auto exposure (AE) operation, the auto white balance (AWB) operation, and the electronic flash (EF) operation. A shutter switch SW2 64 turns on when pressing the shutter button (not shown) is completed. Then, the shutter switch SW2 64 starts a series of processes, that is, an exposure process, in which a signal read out from the imaging device 14 is written to the memory 30 as an image data via the A/D converter 16 and the memory control circuit 22, a development process, in which the image processing circuit 20 and the memory control circuit 22 carry out an arithmetic operation, and a recording process, in which the image data is read out from the memory 30, is compressed by the compression/decompression circuit 32, and is written to the recording medium 200 or 210.

A playback switch 66 starts a playback operation, in which, in a shooting mode, a captured image is read out from the memory 30 or the recording medium 200 or 210 and is displayed by the image display unit 28.

A one-shot/continuous mode switch 68 is used to select either a one-shot mode or a continuous shooting mode. In a one-shot mode, one picture is taken when the shutter switch SW2 is depressed and the image processing apparatus enters a waiting mode. In a continuous shooting mode, pictures are continuously taken while the shutter switch SW2 is depressed.

An ISO speed setting switch 69 is used for setting an ISO speed by changing the gain of the imaging device 14 or the gain of the image processing circuit 20.

An operation unit 70 is composed of various types of buttons and touch panels. The operation unit 70 includes a menu button; a setting button; a macro button; a next page button for changing a page in a multiple image playback mode; a flash setting button; a button for selecting a one-shot mode, a continuous shooting mode, and a self-timer shooting mode; a menu selection plus (+) button; a menu selection minus (−) button; a playback image selection plus (+) button; a playback image selection minus (−) button; an image quality selection button; an aperture compensation button; a date and time setting button; a selection button for selecting a function from among various types of functions of a panorama mode; a determination and execution button for determining and executing a function of the panorama mode; a display on/off switch for turning on and off the image display unit 28; a quick review on/off switch for setting a quick review function for automatically playing back a just taken picture; a compression mode switch for selecting a JPEG compression ratio or selecting a CCD-RAW mode for directly digitizing and recording a signal from an imaging device in a recording medium; a playback switch for selecting a variety of functions, such as a playback mode, a multiple image playback/delete mode, and a PC connection mode; and an AF mode selection switch for selecting either one-shot AF mode, in which an auto focus operation starts when the shutter switch SW1 is depressed and, once the focus is locked, the in-focus state continues, or a servo AF mode, in which the auto focus operation continues while the shutter switch SW1 is depressed. By realizing the function of the plus button and the minus button using a rotary dial switch, a number and a function can be more easily selected.

A power switch 72 is used for selecting a power-on mode or power-off mode of the image processing apparatus 100. Simultaneously, power-on and off of attached equipment, such as the lens unit 300 connected to the image processing apparatus 100, an external strobe, and the recording media 200 and 210, can be selected.

Power control portion 80 includes a battery detection circuit, a DC-to-DC converter, and a switch for switching a block supplied with power. The power control portion 80 detects the presence of a battery, the type of the battery, and the battery level, and then controls the DC-to-DC converter based on the detection result and a command from the system control circuit 50 to supply required voltage to each component including the recording medium during a required period of time.

The image processing apparatus 100 further includes a connector 82. The connector 82 is connectable to a connector 84 of a power supply portion 86. Power supply portion 86 is composed of a primary battery, such as an alkaline battery and a lithium battery, a secondary battery, such as a NiCd battery, a NiMH battery, and a Li battery, and an AC adaptor. Interfaces 90 and 94 serve as interfaces with a recording medium including a memory card and a hard disk. Connectors 92 and 96 serve as connectors with the recording medium including a memory card and a hard disk. Installed recording medium detecting portion 98 detects if the recording medium 200 or 210 is attached to the connectors 92 and 96.

In this embodiment, two interfaces 90 and 94 and two connectors 92 and 96 for attaching recoding media are installed. However, other configurations can be used, i.e., one interface and one connector, or three or more of interfaces and connectors may be installed. In addition, interfaces and connectors of different standards may be installed. The interfaces and connectors may be compliant with the PCMCIA card and the compactflash® (CF) card. Furthermore, if the interfaces 90 and 94 and the connectors 92 and 96 are compliant with the PCMCIA card and the compactflash® (CF) card, image data and management information attached to the image data can be transferred to and from another computer and a peripheral device, such as a printer, by connecting a communication card, including a LAN card, a modem card, a USB card, an IEEE 1394 card, a P1284 card, a SCSI card, and a personal handyphone system (PHS) communication card.

The optical finder 104 leads light incident on the lens 310 via the aperture 312, the lens mounts 306 and 106, the mirrors 130 and 132 through a single-lens reflex mechanism to form an optical image. Thus, a picture can be taken using only the optical finder 104 without the electronic viewfinder function provided by the image display unit 28. Inside the optical finder 104, some of the functions of the display unit 54 are displayed. For example, the optical finder 104 displays an in-focus indicator, a camera shake warning, a flash recharge status, a shutter speed, an aperture setting, and an exposure compensation status.

Communication portion 110 includes various types of communication functions, such as RS232C, USB, IEEE 1394, P1284, SCSI, modem, LAN, and wireless communication. A connector 112 connects the image processing apparatus 100 to another device via the communication portion 110. When the communication portion 110 employs wireless communication, the connector 112 functions as an antenna 112.

An interface 120 connects the image processing apparatus 100 to the lens unit 300 in the lens mount 106. Also, a connector 122 electrically connects the image processing apparatus 100 to the lens unit 300. The connector 122 transfers a control signal, a state signal, and a data signal between the image processing apparatus 100 and the lens unit 300. In addition, the connector 122 supplies electric currents having different voltage to the lens unit 300. Additionally, the connector 122 may employ optical communication and voice communication.

The mirrors 130 and 132 lead light incident on the lens 310 to the optical finder 104 through a single-lens reflex mechanism. The mirror 132 may be a quick-return mirror or a half mirror.

The recording medium 200 may be a memory card or a hard disk. The recording medium 200 includes a recording unit 202 composed of a semiconductor memory or a magnetic disk, an interface 204 with the image processing apparatus 100, and a connector 206 for connecting to the image processing apparatus 100.

The recording medium 210 may be a memory card or a hard disk. The recording medium 210 includes a recording unit 212 composed of a semiconductor memory or a magnetic disk, an interface 214 with the image processing apparatus 100, and a connector 216 for connecting to the image processing apparatus 100.

The lens unit 300 is of an interchangeable lens type. The lens mount 306 mechanically connects the lens unit 300 to the image processing apparatus 100. The lens mount 306 includes various types of functions for electrically connecting the lens unit 300 to the image processing apparatus 100.

An interface 320 connects the lens unit 300 to the image processing apparatus 100 in the lens mount 306. Also, a connector 322 electrically connects the lens unit 300 to the image processing apparatus 100. The connector 322 transfers a control signal, a state signal, and a data signal between the image processing apparatus 100 and the lens unit 300. In addition, the connector 322 supplies electric currents having different voltage to the lens unit 300, or the connector 322 is supplied with electric currents having different voltage from the lens unit 300. In addition to the electrical communication, the connector 322 may employ optical communication and/or voice communication.

Aperture control portion 340 controls the aperture 312 based on metering information from the metering portion 46 in corporation with the shutter control portion 40, which controls the shutter 12. Focus control portion 342 controls focusing of the lens 310. Zoom control portion 344 controls zooming of the lens 310.

A lens system control circuit 350 controls the lens unit 300. The lens system control circuit 350 includes a memory for storing constants, variables, and programs used for the operation thereof and a nonvolatile memory for storing an identification number, management information, maximum and minimum aperture values, a focal length specific to the lens unit 300, and the current and past setting values.

Figure 2:
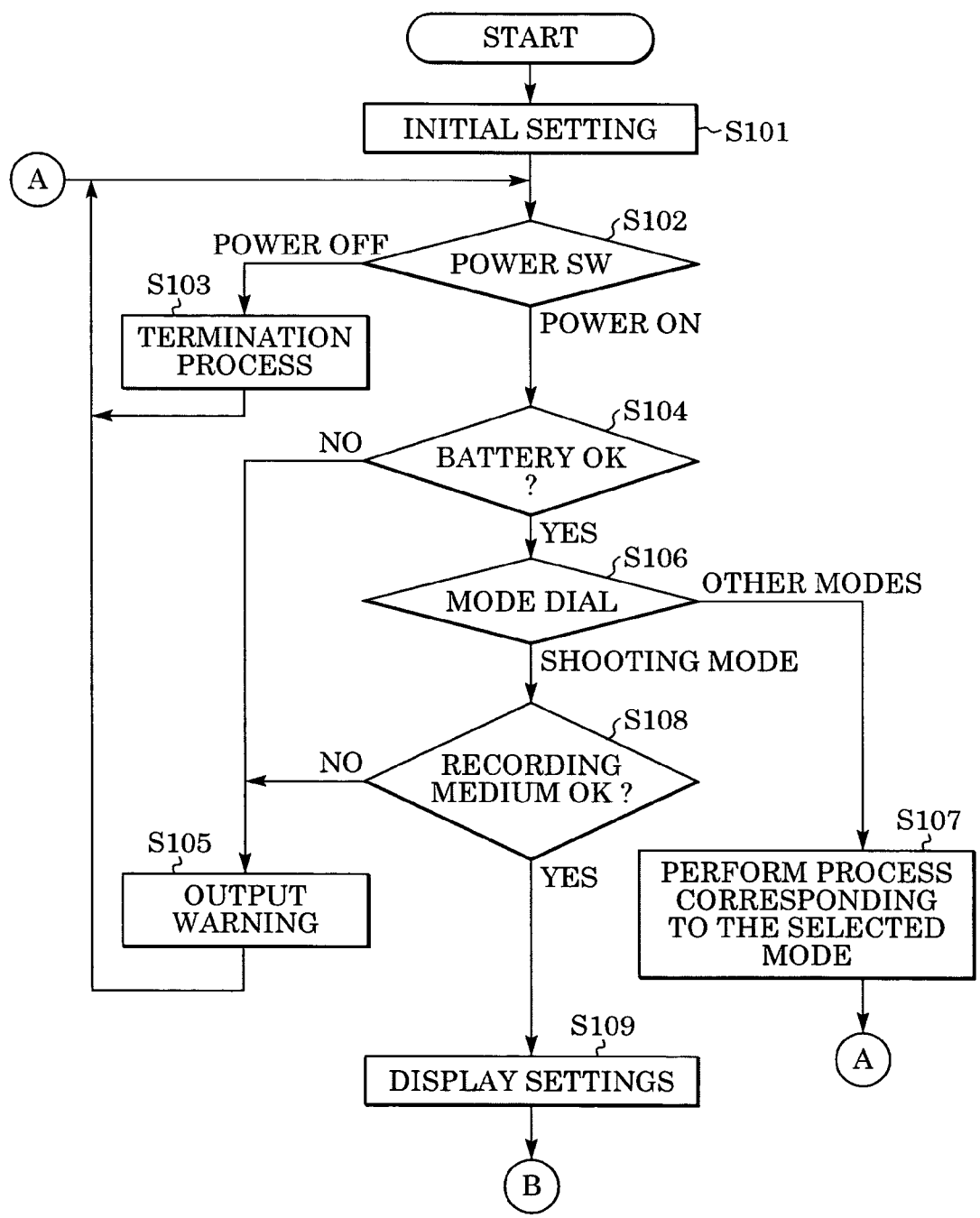
FIGS. 2-3 show a flow chart of a main routine for the operation of the image processing apparatus.
Figure 3:
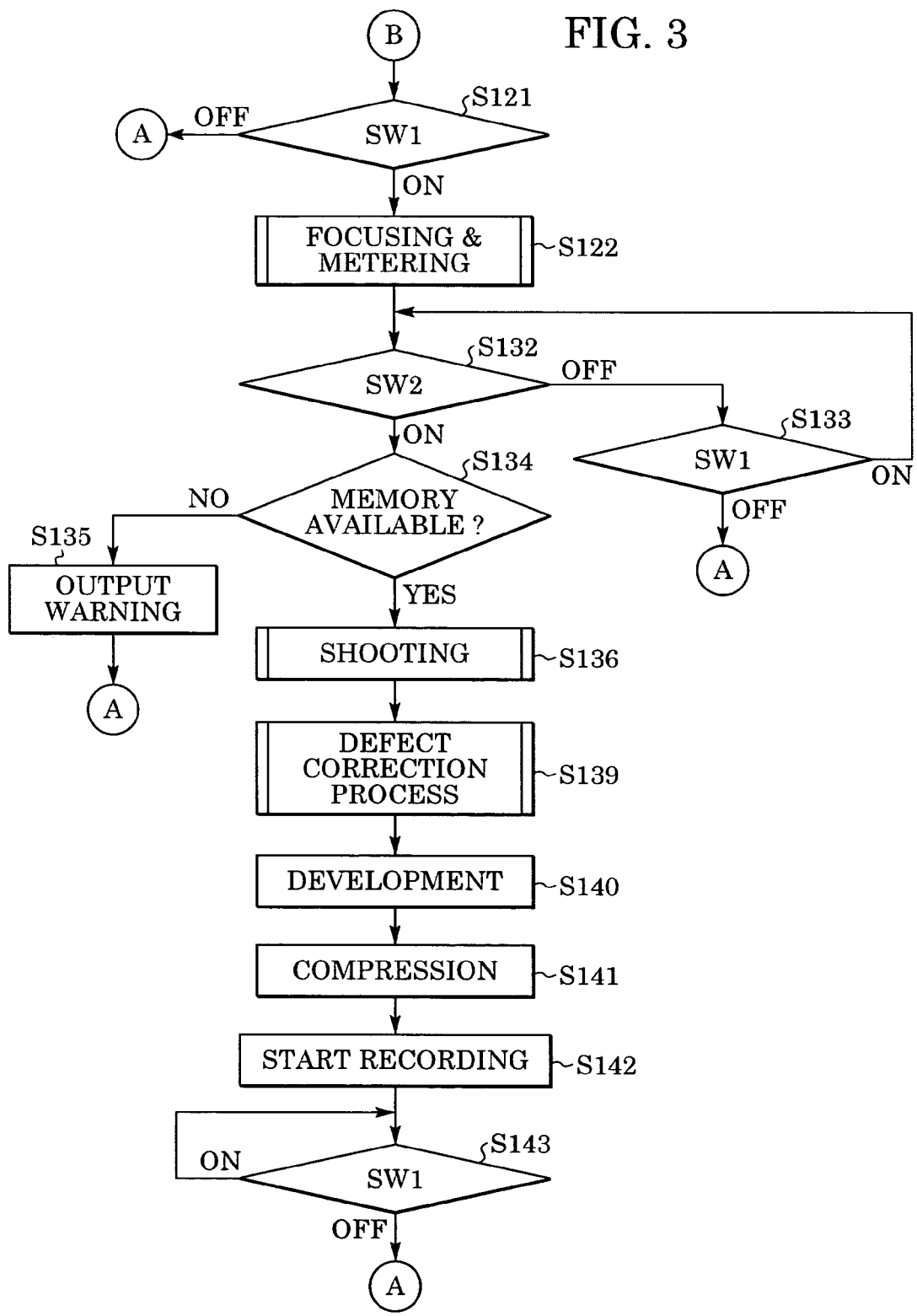

The operation of the image processing apparatus 100 according to the embodiment will be described next with reference to FIGS. 2 to 7. FIGS. 2 and 3 show a flow chart of a main routine for the operation of the image processing apparatus 100. When the image processing apparatus 100 is powered on, for example, when a battery is replaced with a new one, the system control circuit 50 initializes flags and control variables to carry out predetermined initial settings required for each component of the image processing apparatus 100 (step S101).

The system control circuit 50 determines a set position of the power switch 72 (step S102). If it is determined in step S102 that the power switch 72 is in the power-off position, the system control circuit 50 changes all the displays to a completion mode, stores required parameters, setting values including flags and control variables, and setting modes in the nonvolatile memory 56, and carries out a predetermined termination process, in which the power control portion 80 shuts off unnecessary power to each component of the image processing apparatus 100 including the image display unit 28 (step S103). The process then returns to step S102.

If it is determined in step S102 that the power switch 72 is in the power-on position, the system control circuit 50 determines whether a power level of the power supply portion 86, such as a battery, and an operational state cause a problem for the operation of the image processing apparatus 100 using the power control portion 80 (step S104). If a problem is found, the system control circuit 50 outputs a predetermined image or voice warning message using the display unit 54 (step S105). The process then returns to step S102.

If in step S104 it is determined that no problem is found in the power supply portion 86, the system control circuit 50 determines the set position of the mode dial switch 60. If it is determined in step S106 that the mode dial switch 60 is set to a shooting mode, the process proceeds to step S108. However, if it is determined in step S106 that the mode dial switch 60 is set to a mode other than a shooting mode, the system control circuit 50 carries out an operation corresponding to the set mode (step S107). After carrying out the operation corresponding to the selected mode, the process then returns to step S102.

In step S108, the system control circuit 50 determines whether the recording medium 200 or 210 is mounted and whether retrieving management information of image data stored in the recording medium 200 or 210 and the operational state of the recording medium 200 or 210 cause a problem in the operation of the image processing apparatus 100, in particular, a problem in the recording and playback operation of the image data with respect to the recording medium. If a problem is found, the system control circuit 50 outputs a predetermined image or voice warning message using the display unit 54 (step S105). The process then returns to step S102.

If no problem is found in the determination process at step S108, the process proceeds to step S109. In step S109, the system control circuit 50 outputs various settings of the image processing apparatus 100 with images or voice using the display unit 54 (step S109). If an image display of the image display unit 28 turns on, the various settings of the image processing apparatus 100 are output with images or voice using the image display unit 28.

Processing then proceeds to step S121 to determine if the shutter switch SW1 is depressed. If it is determined that the shutter switch SW1 is not depressed, the process returns to step S102. If it is determined that the shutter switch SW1 is depressed, the system control circuit 50 carries out a focusing and metering operation (step S122), in which a focusing operation is carried out to focus the focusing point of the lens 310 on a subject and a metering operation is carried out to determine an aperture value and a shutter speed. If needed, a flash is also set up in the metering operation. The focusing and metering operation (step S122) will be described below in detail with reference to FIG. 4.

The process then proceeds to step S132 to determine if the shutter switch SW2 is depressed. If it is determined that the shutter switch SW2 is not depressed, the system control circuit 50 checks the state of the shutter switch SW1 (step S133). If the shutter switch SW1 is on, the process returns to step S132. However, if the shutter switch SW1 is off, the process returns to step S102.

If it is determined in step S132 that the shutter switch SW2 is depressed, the system control circuit 50 determines whether an image storing buffer area for storing the image data is available in the memory 30 (step S134). If the image storing buffer area in the memory 30 is not available for the new image data, the system control circuit 50 outputs a predetermined image or voice warning message using the display unit 54 (step S135). The process then returns to step S102. One of the examples is the following case: Immediately after a continuous shooting is carried out so as to store the maximum number of pictures in the image storing buffer area of the memory 30, a first picture to be written to the recording medium 200 or 210 has not been written yet and a space for even one new picture is not available in the image storing buffer area of the memory 30. In the case where captured image data is compressed and stored in the image storing buffer area of the memory 30, it is determined, at step S134, whether an area for storing the data is available in the image storing buffer area of the memory 30 on the grounds that the amount of compressed image data varies depending on the compression mode settings.

If it is determined in step S134 that an area for storing the captured image data is available in the image storing buffer area of the memory 30, the system control circuit 50 carries out a shooting operation (step S136), in which the system control circuit 50 reads out the captured image signal accumulated for a predetermined period of time from the imaging device 14 and then writes the captured image data to a predetermined area of the memory 30 via the A/D converter 16, the image processing circuit 20, and the memory control circuit 22. This shooting operation (step S136) will be described below in detail with reference to FIG. 5.

After the shooting operation (step S136) is completed, the process proceeds to a defective pixel correcting operation (step S139), in which an adjacent defective pixel is corrected by firmware. The defect correction process (step S139) will be described below in detail with reference to FIG. 7.

The system control circuit 50 reads out, via the memory control circuit 22, partial image data written to a predetermined area of the memory 30 after the defect correction process. Then, the system control circuit 50 carries out a WB (white balance) integration arithmetic operation and an OB (optical black) integration arithmetic operation on the data, which are required for the later development operation. The results of the arithmetic operations are stored in an internal memory of the system control circuit 50 or in the memory 52.

Thereafter, the system control circuit 50 reads out the image data written into a predetermined area of the memory 30 after the defect correction process using the memory control circuit 22 and, if needed, using the image processing circuit 20. The system control circuit 50 then carries out various development operations including an auto white balance (AWB) operation, a gamma conversion operation, and a color conversion operation on the readout data using the result of the arithmetic operation stored in the internal memory of the system control circuit 50 or in the memory 52 (step S140).

Furthermore, the system control circuit 50 reads out the image data written to a predetermined area of the memory 30, carries out an image compression operation in accordance with the set mode by using the compression/decompression circuit 32 (step S141), and writes the captured image data after the series of operations to an available area in the image storing buffer area of the memory 30.

After the series of shooting operations, the system control circuit 50 starts a recording operation (step S142), in which the system control circuit 50 reads out the image data stored in the image storing buffer area of the memory 30, and then writes the image data to the recording medium 200 or 210, such as a memory card and a compactflash® card, via the interface 90 or 94 and the connector 92 or 96. This recording operation is carried out every time image data is written to the image storing buffer area of the memory 30 after the series of shooting operations are completed. During the writing operation of the image data to the recording medium 200 or 210, the display unit 54, for example, blinks an LED to notify a user of the writing operation.

Subsequently, the system control circuit 50 determines whether the shutter switch SW1 is depressed (step S143). If the shutter switch SW1 is depressed, the process waits for the release of the shutter switch SW1. If the shutter switch SW1 is not depressed (i.e. shutter switch SW1 is released), the process returns to step S102.

Figure 4:
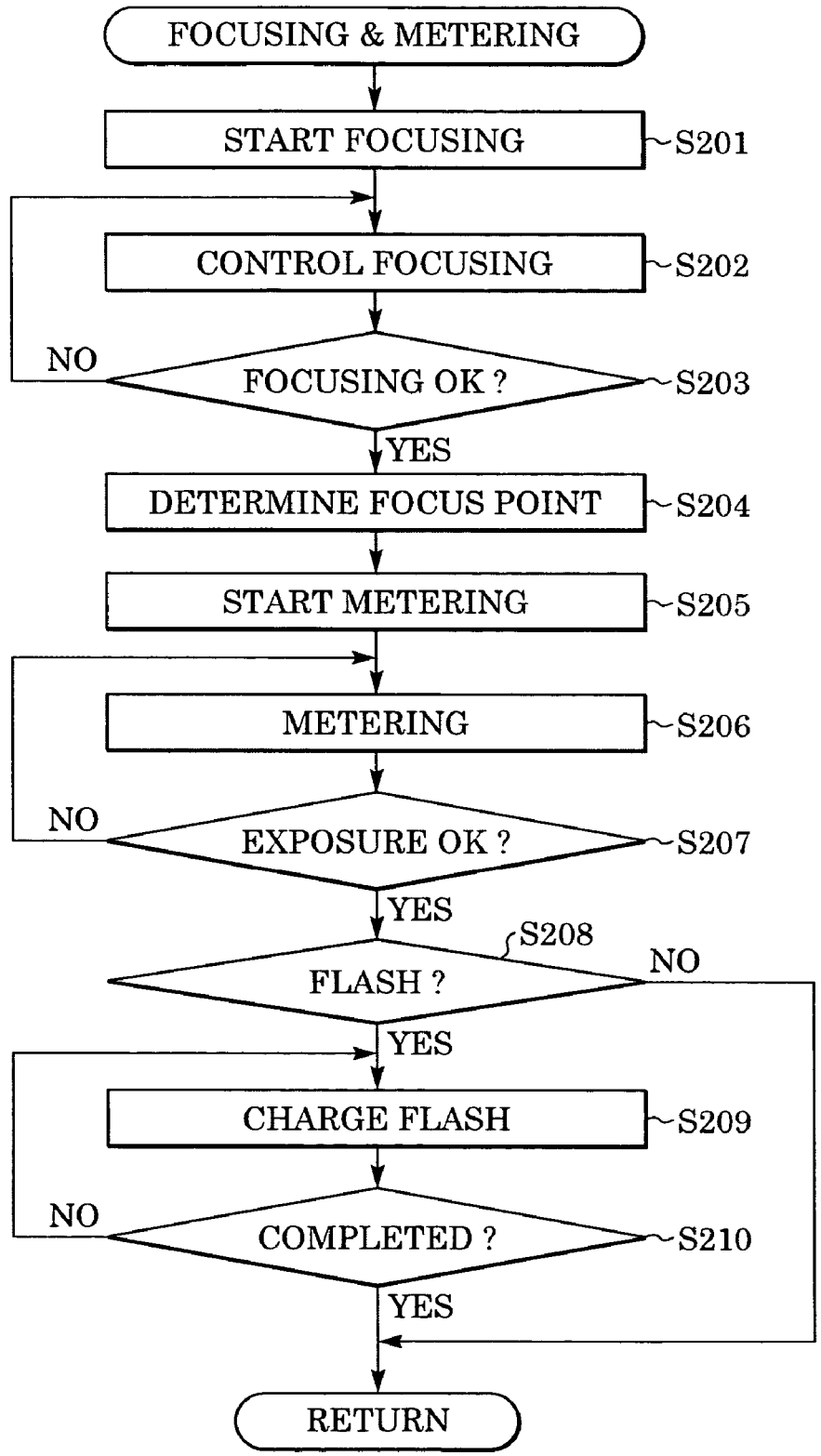
FIG. 4 shows a flow chart of a focusing and metering routine.

FIG. 4 shows a detailed flow chart of the focusing and metering operation at step S122 of FIG. 3. In the focusing and metering operation, the system control circuit 50 communicates various types of signals with the aperture control portion 340 or the focus control portion 342 via the interface 120, the connector 122, the interface 320, and the lens system control circuit 350.

The system control circuit 50 starts the auto focus (AF) operation using the imaging device 14, the focusing portion 42, and the focus control portion 342 (step S201).

In step S202, the system control circuit 50 performs control to lead light incident on the lens 310 to the focusing portion 42 via the aperture 312, the lens mounts 306 and 106, the mirror 130, and a focusing sub mirror (not shown), and then determines whether an optical image formed on the focusing portion 42 is in focus. The system control circuit 50 carries out the AF operation using the focusing portion 42 while driving the lens 310 using the focus control portion 342 (step S202) until it is determined (in step S203) that the optical image is in focus.

If it is determined in step S203 that the optical image is in focus, then the system control circuit 50 determines a focus point in focus from among a plurality of focus points and stores the data of the determined point in the internal memory of the system control circuit 50 or in the memory 52 along with focusing data and set parameters. The process then proceeds to step S205.

Thereafter, the system control circuit 50 starts the auto exposure (AE) operation using the metering portion 46 (step S205).

The system control circuit 50 performs control to lead light incident on the lens 310 to the metering portion 46 via the aperture 312, the lens mounts 306 and 106, the mirrors 130 and 132, and a lens for metering (not shown), and then measures the exposure status of an optical image formed on the metering portion 46. Until it is determined that the exposure status is appropriate with respect to an ISO speed pre-set by the ISO speed setting switch 69 (step S207), the system control circuit 50 carries out the AE operation using the metering portion 46 (step S206).

If it is determined that the exposure status is appropriate (step S207), the system control circuit 50 stores the exposure data and set parameters in the internal memory of the system control circuit 50 or in the memory 52. The process then proceeds to step S208.

Additionally, based on the exposure (AE) result detected by the exposure operation (step S206) and the shooting mode set by the mode dial switch 60, the system control circuit 50 determines an aperture value (Av value) and a shutter speed (Tv value). Based on the determined shutter speed (Tv value), the system control circuit 50 then determines a charge accumulation time for the imaging device 14 and carries out a shooting operation in a time period identical to the charge accumulation time.

The system control circuit 50 determines whether flash illumination is required based on the measured data obtained in the metering operation at step S206 (step S208). If it is determined that the flash illumination is required, a flash flag is set and the flash 48 is charged (step S209) until the charge of the flash 48 is completed (step S210). When the charge of the flash 48 is completed (step S210), the focusing and metering operation is completed.

Figure 5:
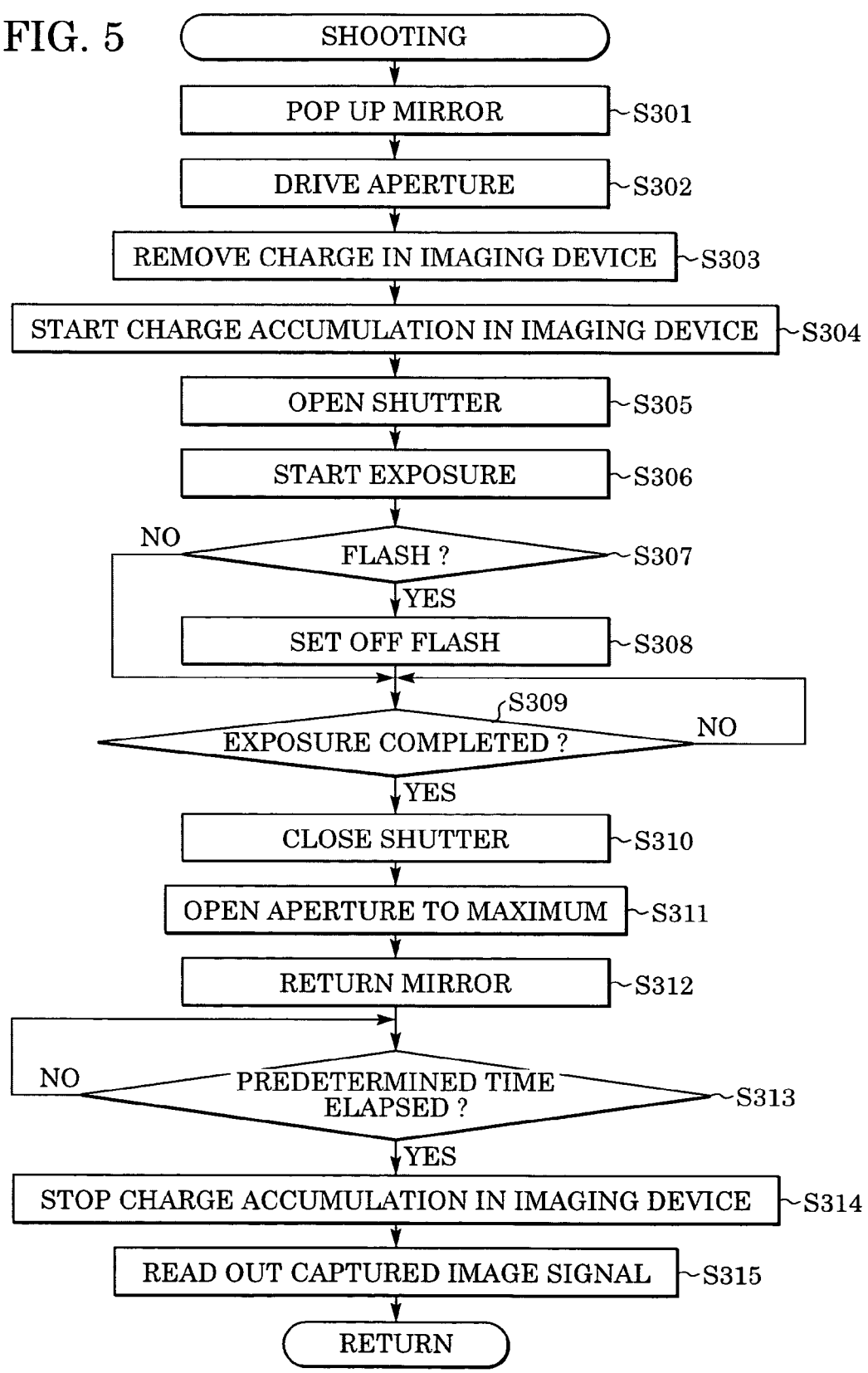
FIG. 5 shows a flow chart of a shooting processing routine.

FIG. 5 shows a detailed flow chart of the shooting operation at step S136 of FIG. 3. In the shooting operation, the system control circuit 50 communicates various types of signals with the aperture control portion 340 or the focus control portion 342 via the interface 120, the connectors 122 and 322, the interface 320, and the lens system control circuit 350.

The system control circuit 50 moves the mirror 130 to a mirror pop-up position using mirror driving portion (not shown) (step S301) and drives the aperture 312 to a predetermined aperture value position using the aperture control portion 340 based on the stored exposure data in the internal memory of the system control circuit 50 or in the memory 52 (step S302).

The system control circuit 50 completely removes the charge of the imaging device 14 (step S303), and then starts the accumulation of charge in the imaging device 14 (step S304). Thereafter, the system control circuit 50 instructs the shutter control portion 40 to open the shutter 12 (step S305) so as to start the exposure of the imaging device 14 (step S306). Simultaneously, it is determined whether flash illumination of the flash 48 is required based on the flash flag (step S307). If it is determined that flash is required, the system control circuit 50 sets off the flash 48 (step S308).

The system control circuit 50 waits for the completion of the exposure of the imaging device 14 in accordance with the measured data (step S309) and closes the shutter 12 (step S310) using the shutter control portion 40 to terminate the exposure of the imaging device 14 when exposure has completed.

The system control circuit 50 drives the aperture 312 to the maximum aperture value position using the aperture control portion 340 (step S311) and moves the mirror 130 to the mirror-down position using the mirror driving portion (not shown) (step S312).

When it is determined in step S313 that the set charge accumulation time has elapsed, the system control circuit 50 completes the charge accumulation of the imaging device 14 (step S314). The system control circuit 50 then reads out a charge signal from the imaging device 14 and writes it to a predetermined area of the memory 30 as captured image data via the A/D converter 16, the image processing circuit 20, and the memory control circuit 22 (step S315).

At that time, as described above, the defect correction circuit 222 refers to a single defective pixel address information copied from the nonvolatile memory 56 to the memory 30 to determine whether data whose address is identical to the defective pixel address written in the address information is output from the A/D converter 16. If the addresses are identical, the defect correction circuit 222 replaces the output data with the previous output of a pixel having the same color. Thus, the output of a single defective pixel is corrected between the time when the defective pixel is read out from the imaging device 14 until the output is written to the memory 30, and therefore, the pixel is not recognized as a defective pixel. After the series of operations is completed, the shooting process routine is completed.

Figure 7:
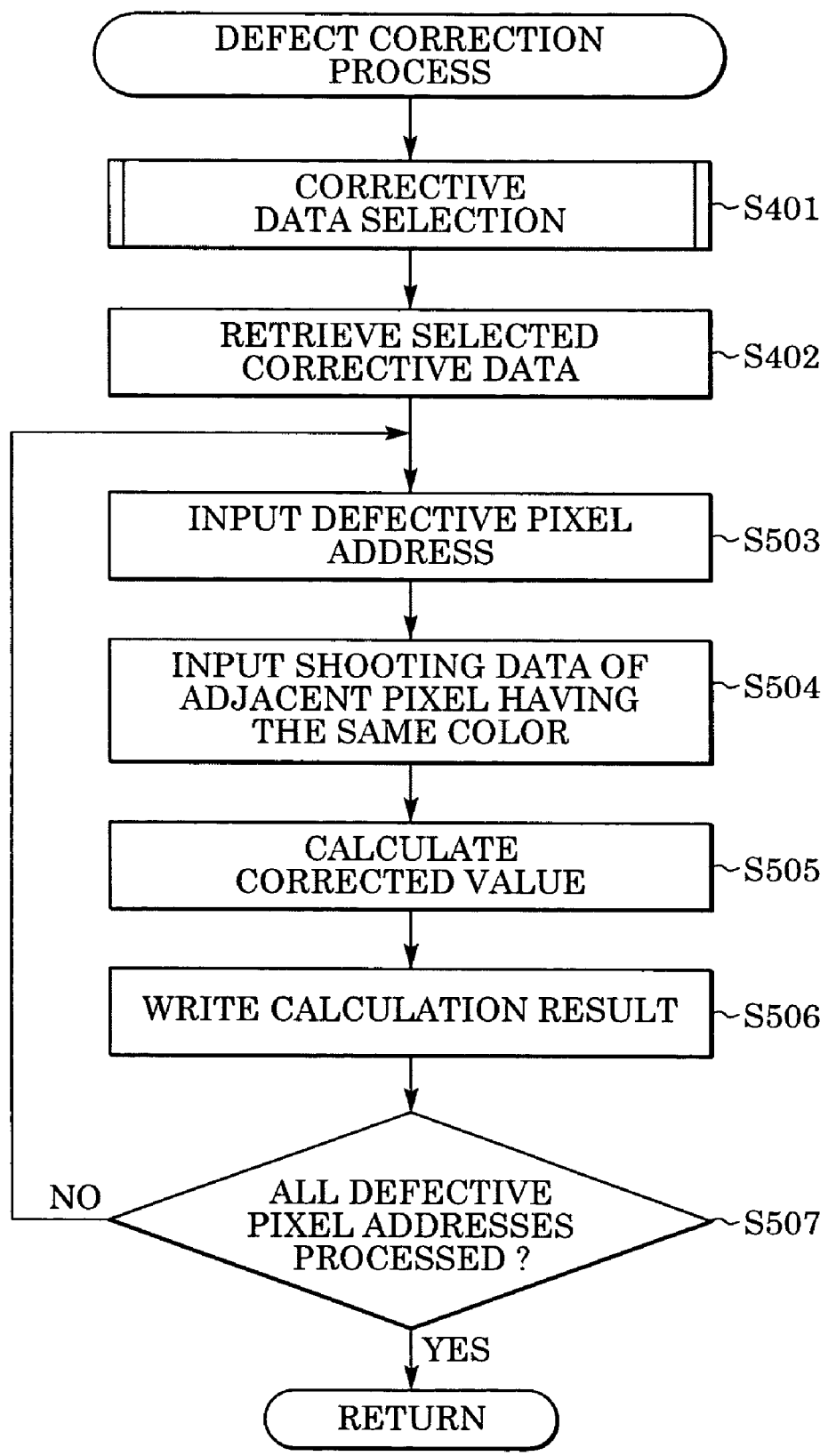
FIG. 7 shows a flow chart of a defect correction routine.

FIG. 7 shows a detailed flow chart of the defect correction operation by firmware at step S139 of FIG. 3. At step S401, corrective data is selected depending on the various conditions. This is because a target of the correction changes depending on the shooting conditions, such as the ISO speed and the imaging time, and environmental conditions, such as temperature. Selection of corrective data (step S401) is described below with reference to FIG. 6.

FIG. 6 shows a selection table for the corrective data. If the imaging time period is less than or equal to T1, data1 is used as adjacent defective pixel address information regardless of the ISO speed. Defective pixel information written in data1 is address information of a pixel that is one of adjacent pixels generating an abnormal output regardless of the imaging time period. Data1 does not contain address information of a defective pixel called a white spot. One reason is the reduction of the number of corrections: since a correction process by firmware requires a considerable amount of memory access time, the processing time is likely to be insufficient in the case of a short shutter time, in particular, a high-speed continuous shooting. Therefore, the number of corrections must be kept to a minimum. The other reason is: when the shutter time is short, the output of a white-spot defective pixel tends to be small, and therefore, the defect is not noticeable. Consequently, the correction of the white-spot defective pixel is not required.

If the imaging time period is greater than T1 and less than or equal to T2, data2, data3, and data4 are selectively used depending on the ISO speed. Defective pixel information written in data2 contains address information of a pixel that generates an abnormal output regardless of the imaging time period and address information of adjacent defective pixels whose output of a white-spot defect is greater than or equal to 100 mV at the measurement time. Similarly, defective pixel information written in data3 contains address information of a pixel that generates an abnormal output regardless of the imaging time period and address information of adjacent defective pixels whose output of a white-spot defect is greater than or equal to 50 mV at the measurement time. Defective pixel information written in data4 contains address information of a pixel that generates an abnormal output regardless of the imaging time period and address information of adjacent defective pixels whose output of a white-spot defect is greater than or equal to 25 mV at the measurement time.

If the imaging time period is greater than T2, data5 is used regardless of the ISO speed. Defective pixel information written in data5 contains address information of a pixel that generates an abnormal output regardless of the imaging time period and address information of adjacent defective pixels whose output of a white-spot defect is greater than or equal to 12.5 mV at the measurement time.

In such a data structure, for example, the address of a defective pixel having an output level greater than or equal to 100 mv in the factory shipment data is redundantly written to data2, data3, data4, and data5. However, this is an effective scheme for high-speed processing. Although the number of corrective data items increases as the used data moves from data2 to data5, this scheme causes no problem in an area of a low-speed (i.e., long) exposure time, at least, in terms of the shooting interval. Accordingly, even though a long correction time is required after shooting, a problem does not occur.

As described above, corrective data is selected based on the charge accumulation time determined in accordance with the currently set ISO speed and the shutter speed (Tv value) determined by the metering operation (step S206). In this embodiment, the defect correction is carried out by accessing image data written to the memory 30 in advance by firmware and by repeating a readout operation, an arithmetic operation, and a writing operation on the data.

The adjacent defective pixel address information indicates a pixel having another defective pixel in the vicinity thereof. If the correction scheme for the pixel is identical to the scheme employed by the defect correction circuit in the image processing circuit 20, the result of the correction is visible. Therefore, another scheme is required. For example, outputs of four pixels, namely, pixels of the same color on the left, right, top and bottom of the defective pixel, are averaged and the output of the defective pixel is replaced with the average value.

Using this scheme, for example, the following four algorithms are proposed:
(1) If one of the pixels of the same color on the left, right, top and bottom of the defective pixel of interest is defective, the output of the pixel of interest is replaced with the average output value of the other three pixels.
(2) If two of the pixels of the same color on the left, right, top and bottom of the defective pixel of interest are defective, the output of the pixel of interest is replaced with the average output value of the other two pixels.
(3) If three of the pixels of the same color on the left, right, top and bottom of the defective pixel of interest are defective, the output of the pixel of interest is replaced with the output value of the other one pixel.
(4) If all of the pixels of the same color on the left, right, top and bottom of the defective pixel of interest are defective, correction of the pixels in the vicinity are attempted in the above-described manner. If at least one of the pixels is corrected, the defective pixel of interest is corrected in the above-described manner.

At step S402, the corrective data item selected at step S401 is retrieved. The system control circuit 50 then carries out the point defect correcting operation. In order to compensate for a white spot of the imaging device, the system control circuit 50 refers to the address information indicating a white-spot defective pixel in the corrective data selected at step S402, and corrects a pixel corresponding to the white spot in the captured image written to the predetermined area of the memory 30 by using the captured image data of adjacent pixels of the same color.

At step S503, defect address information for one pixel is first read out from the top of the selected defect data. By referencing this information, the corresponding pixel address in the captured image written to the memory 30 can be identified.

Subsequently, at step S504, captured image data of the pixels of the same color adjacent to the pixel identified at step S503 are input. The defect address information also contains information about adjacent defective pixels. Accordingly, if a defective pixel is found among the adjacent pixels of the same color, the output of the pixel can be eliminated.

At step S505, a corrected value is calculated from the values of adjacent pixels acquired at step S504 based on the above-described algorithm.

Thereafter, at step S506, the corrected value acquired at step S505 is written to the address of the corresponding pixel in the memory 30. The correction operation of the corresponding pixel is then completed.

At step S507, it is determined whether the correction operation for all of the defective pixels written in the retrieved data is completed. If not completed, the process returns to step S503, where the next defective pixel address information written in the corrective data is read out and the same operations are repeated.

If, at step S507, the correction operation for all of the defective pixels written in the corrective data selected at step S401 is completed, the entire sequence of the defect correction process is completed.

The setting of the determination level for these data is determined based on the detectable level of the factory shipment data, its detection accuracy, and the actual image quality obtained. Additionally, this determination process is carried out outside the image processing apparatus 100, and the image processing apparatus 100 only receives the addresses of pixels extracted using the above-described determination level. Therefore, this method has the least negative impact on the performance of the image processing apparatus 100.

In the above-described embodiment, a table for selecting corrective data using an ISO speed and a charge accumulation time is prepared for the firmware, whereas defect correction data for the hardware (the dedicated defect correction circuit for correcting a defect pixel) is not selectable. However, a plurality of the defect correction data items for the hardware may be prepared using an ISO speed and a charge accumulation time in the same manner, and one of the defect correction data items may be selected in accordance with the conditions. Additionally, for example, the conditions may include temperature. Furthermore, since a processing time is likely to be insufficient in the case of a short shutter time, particularly in a high-speed continuous shooting, the table may include the condition that a defect correction by firmware is not carried out.

In the above-described embodiment, the corrective data is stored in a nonvolatile memory and is transferred to the memory 30 when needed. However, it is apparent that the transfer process may be eliminated if a system can process while reading the corrective data stored in the nonvolatile memory. Alternatively, transferring the corrective data to the memory 30 when needed may be eliminated if a system can include a dedicated memory or memory area.

In the above-described embodiment, the output of the imaging device 14 is A/D converted and the converted signal is delivered to the defect correction circuit 222 so as to carry out the correction operation before writing the converted signal to the memory. However, the correction method is not limited thereto.

In the above-described embodiment, the corrective data is generated outside the image processing apparatus 100 based on data acquired at a factory shipment time. However, the image processing apparatus 100 may create the corrective data by itself. In this case, the created data may be directly written to the memory 30 without storing the address information in the nonvolatile memory.

Additionally, a defect pixel may be detected from dark image data captured by the image processing apparatus 100 and corrective data may be created as described in this embodiment.

The corrective data may be loaded from the nonvolatile memory to an internal memory of the system control circuit 50 at power-on time.

In the above-described embodiment, two different corrective data sets at maximum are used for the defect correction operation. However, a higher number of correction operations may be carried out. Additionally, although the single defect pixel address information is completely separated from the adjacent defect pixel address information, the two types of information may be combined if a processing unit can determine the difference between the two types.

In the above-described embodiment, the hardware (the dedicated defect correction circuit for correcting a defect pixel) carries out correction by a replacement method and the firmware carries out correction by an interpolation method based on signals in the vicinity of the defective pixel. However, the correction method is not limited thereto. The hardware may carry out correction by interpolation. The firmware may carry out correction by replacement.

In an image processing apparatus having the configuration according to the embodiment, a defective pixel that independently occurs can be accurately corrected by hardware at high speed, and a defective pixel that has another defective pixel in the vicinity can be precisely corrected by firmware using a complex algorithm, although the speed is not as fast as the hardware.

In the above-described embodiment, only a white-spot defective pixel is corrected. However, a defective pixel of another type can also be corrected for any conditions. In this case, address information of the defective pixel of another type is written to corrective data for each condition. This process can be carried out outside the image processing apparatus when the corrective data is created.

The present invention can also be achieved by supplying a recording medium storing program code of software that realizes the functions of the above-described embodiments to a system or an apparatus and causing a computer (CPU (central processing unit) or MPU (micro-processing unit)) of the system or the apparatus to read and execute the program code stored in the recording medium.

In such a case, the program read out from the recording medium achieves the functions of the present invention by itself.

The recording medium for supplying the program includes, for example, a flexible disk, a hard disk, an optical disk, a magneto optical disk, a CD-ROM (compact disk-read-only memory), a CD-R (compact disk-recordable), a magnetic tape, a nonvolatile memory card, and a ROM.

Additionally, in addition to achieving the functions of the above-described embodiments by the computer executing the readout program, the functions of the above-described embodiments can be achieved by a process that an OS (operating system) running on the computer executes some of or all of the effective functions in response to instructions of the program.

Furthermore, the functions of the above-described embodiments can be achieved by a process in which, after a program read from a recording medium is stored in a memory of an add-on expansion board inserted in a computer or a memory of an add-on expansion unit connected to a computer, a CPU in the add-on expansion board or in the add-on expansion unit executes some of or all functions described in the above-described embodiments.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-124409 filed Apr. 20, 2004, which is hereby incorporated by reference herein.

What is claimed is:

1. An image processing apparatus comprising:
an imaging device comprising a plurality of pixels for outputting image data comprising signals output from the plurality of pixels;
an image recording device for recording image data output from the imaging device;
a defective information storing device for storing first defective pixel address information including information of an address for a first defective pixel, and second defective pixel address information including information of an address for a second defective pixel, wherein the first defective pixel does not have another adjacent defective pixel but the second defective pixel has another adjacent defective pixel;
a first correction processing device for correcting a first defective pixel included in the image data based on the first defective pixel address information which is stored in the defective information storing device before recording the image data in the image recording device; and a second correction processing device for correcting a second defective pixel included in the image data corrected by the first correction processing device based on the second defective pixel address information which is stored in the defective information storing device before recording the image data in the image recording device.

2. The image processing apparatus according to claim 1, wherein at least one of the first correction processing device and the second correction processing device selects a corrective data item by using at least one of shooting conditions and environmental conditions.

3. The image processing apparatus according to claim 2, wherein the shooting conditions include at least one of a continuous shooting mode, a shutter speed, and an ISO speed.

4. The image processing apparatus according to claim 2, wherein the environmental conditions include temperature.

5. The image processing apparatus according to claim 1, wherein the first correction processing device operates at all times regardless of shooting conditions and environmental conditions.

6. The image processing apparatus according to claim 5, wherein the shooting conditions include at least one of a continuous shooting mode, a shutter speed, and an ISO speed.

7. The image processing apparatus according to claim 5, wherein the environmental conditions include temperature.

8. The image processing apparatus according to claim 1, wherein the second correction processing device stops operating depending on at least one of shooting conditions and environmental conditions.

9. The image processing apparatus according to claim 8, wherein the shooting conditions include at least one of a continuous shooting mode, a shutter speed, and an ISO speed.

10. The image processing apparatus according to claim 8, wherein the environmental conditions include temperature.

11. The image processing apparatus according to claim 1, further comprising:
    a lens for forming an image on the imaging device;
    an analog-to-digital converter for analog-to-digital converting a signal from the imaging device; and
    a storage control device for carrying out control to store a signal output from the analog-to-digital converter in the storage device.

12. An image processing apparatus according to claim 1,
    wherein the first correction processing device replaces data of the first defective pixel to be corrected with data output from a pixel having the same color as the first defective pixel, and
    wherein the second correction processing device replaces data of the second defective pixel to be corrected with data output from a plurality of pixels having the same color as the second defective pixel.

13. An image processing method comprising:
    outputting image data comprising signals output from a plurality of pixels;
    correcting a first defective pixel included in the image data based on first defective pixel address information including information of an address for the first defective pixel which is stored in a defective information storing device, the first defective pixel not having another adjacent defective pixel;
    recording the image data of which the first defective pixel is corrected in an image recording device; and
    correcting a second defective pixel included in the image data recorded in the image recording device based on second defective pixel address information including information of an address for the second defective pixel which is stored in the defective information storing device, the second defective pixel having another adjacent defective pixel.

* * * * *